US008111513B2

(12) United States Patent
Yeh et al.

(10) Patent No.: US 8,111,513 B2
(45) Date of Patent: Feb. 7, 2012

(54) INDUSTRIAL COMPUTER

(75) Inventors: Mei-Yin Yeh, Taipei (TW); Yi-Chun Tang, Taipei (TW); Ho-Ching Huang, Taipei (TW); Hui-Chen Wang, Taipei (TW); I-Tien Hsieh, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 139 days.

(21) Appl. No.: 12/792,744

(22) Filed: Jun. 3, 2010

(65) Prior Publication Data

US 2010/0309624 A1 Dec. 9, 2010

(30) Foreign Application Priority Data

Jun. 4, 2009 (TW) .............................. 98118615 A

(51) Int. Cl.
*H05K 7/20* (2006.01)
(52) U.S. Cl. ........ 361/695; 361/690; 361/700; 361/704; 361/707; 165/80.3; 165/104.33; 174/15.2; 174/16.1; 174/16.3
(58) Field of Classification Search ........................ None
See application file for complete search history.

(56) References Cited

U.S. PATENT DOCUMENTS

| 5,424,913 | A | | 6/1995 | Swindler |
| 5,835,348 | A | * | 11/1998 | Ishida ............................ 361/699 |
| 5,969,940 | A | * | 10/1999 | Sano et al. ............... 361/679.52 |
| 6,002,587 | A | * | 12/1999 | Shusa et al. .................... 361/704 |
| 6,567,269 | B2 | | 5/2003 | Homer |
| 6,728,105 | B2 | * | 4/2004 | Tanaka .......................... 361/704 |
| 6,999,315 | B2 | * | 2/2006 | Inoue ............................ 361/700 |
| 7,336,489 | B1 | | 2/2008 | Chen |
| 7,821,782 | B2 | * | 10/2010 | Doherty et al. .......... 361/679.26 |
| 7,903,418 | B2 | * | 3/2011 | Tracy et al. ................... 361/714 |
| 2003/0169568 | A1 | | 9/2003 | Tanaka |

FOREIGN PATENT DOCUMENTS

| CN | 2385369 Y | 6/2000 |
| CN | 101187824 A | 5/2008 |
| TW | M306344 | 2/2007 |
| TW | I299396 | 8/2008 |
| TW | M346269 | 12/2008 |

* cited by examiner

*Primary Examiner* — Boris Chervinsky
(74) *Attorney, Agent, or Firm* — Winston Hsu; Scott Margo

(57) ABSTRACT

An industrial computer includes a first casing, a second casing, a storage unit, a cover, and a heat dissipation unit. The second casing and the first casing form a closed casing, and the outside of the second casing has a containing area. The storage unit is disposed at the containing area. The cover is removably assembled at the second casing to cover the containing area and contact the storage unit. The heat dissipation unit is disposed at the cover.

20 Claims, 6 Drawing Sheets

INDUSTRIAL COMPUTER

CROSS-REFERENCE TO RELATED APPLICATIONS

This Non-provisional application claims priority under 35 U.S.C. §119(a) on Patent Application No(s). 098118615 filed in Taiwan, Republic of China on Jun. 4, 2009, the entire contents of which are hereby incorporated by reference.

BACKGROUND OF THE INVENTION

1. Field of the Invention

This invention relates to a computer and, more particularly, to an industrial computer.

2. Description of the Related Art

An industrial computer is a computer which is not used for a general consuming or commercial use. Since the industrial computer is generally used in the demanding environment, the industrial computer often needs to be resistant to a high temperature and a lower temperature, waterproof, dustproof, and with better heat dissipation.

FIG. 1 is a schematic diagram showing a conventional notebook computer 1. The notebook computer 1 includes a display portion 11 and a main body portion 12. The main body portion 12 has an upper casing 121 and a lower casing 122. In the notebook computer 1, a heat dissipation hole H may be disposed at the lower casing 122 and correspond to the hard disk drive 123 to enhance the heat dissipation of a hard disk drive 123 of a main body.

However, when an environmental temperature of the notebook computer 1 is harsh, the heat generated from the hard disk drive 123 fails to be effectively dissipated from the heat dissipation hole H. Further, since the heat dissipation hole H fails to achieve a waterproof and dustproof effect, the notebook computer 1 fails to satisfy standard requirements of the industrial computer.

As far as a waterproof and dustproof standard of the industrial computer is considered, a closed casing is better for the casing design of the industrial computer. However, the closed casing may cause a worse heat dissipation and the internal temperature of the casing may increase to cause instability of the whole system. Heat generated by internal electronic components such as a central processing unit, a north bridge chip, a memory, a hard disk drive and so on may accumulate in the casing.

BRIEF SUMMARY OF THE INVENTION

The objective of the invention is to provide an industrial computer capable of improving the heat dissipation and satisfying industrial standard requirements The embodiment of the invention provides an industrial computer including a first casing, a second casing, a storage unit, a cover, and a heat dissipation unit. The second casing and the first casing form a closed casing, and the outside of the second casing has a containing area. The storage unit is disposed at the containing area. The cover is removably assembled at the second casing to cover the containing area and contact the storage unit. The heat dissipation unit is disposed at the cover.

The embodiment of the invention further provides an industrial computer including a first casing, a second casing, a storage unit, a cover, and a heat dissipation unit. The second casing and the first casing form a closed casing, and the outside of the second casing has a containing area. The storage unit is disposed at the containing area. The cover is openably assembled at the second casing to cover or expose the containing area. The heat dissipation unit is disposed at the containing area and contacts the storage unit.

In the embodiment of the invention, the heat dissipation unit may include a heat sink, a heat dissipation fin, a heat dissipation plate, a heat pipe, or a heat dissipation fan.

According to the industrial computer in the embodiment of the invention, the heat dissipation unit corresponds to the storage unit, and the heat dissipation unit may include a heat sink, a heat dissipation fin, a heat dissipation plate, a heat pipe, a heat dissipation fan, or a combination thereof. Therefore, the heat dissipation of the storage unit can be greatly improved by the heat dissipation element such as a heat dissipation fin or a heat dissipation fan and so on, and a heat dissipation structure such as a heat dissipation hole may be avoided to satisfy industrial standard requirements.

These and other features, aspects, and advantages of the present invention will become better understood with regard to the following description, appended claims, and accompanying drawings.

DETAILED DESCRIPTION OF THE INVENTION

An industrial computer according to preferred embodiments of the invention is described, and the same element is marked by the same reference number.

First Embodiment

Figure 1:
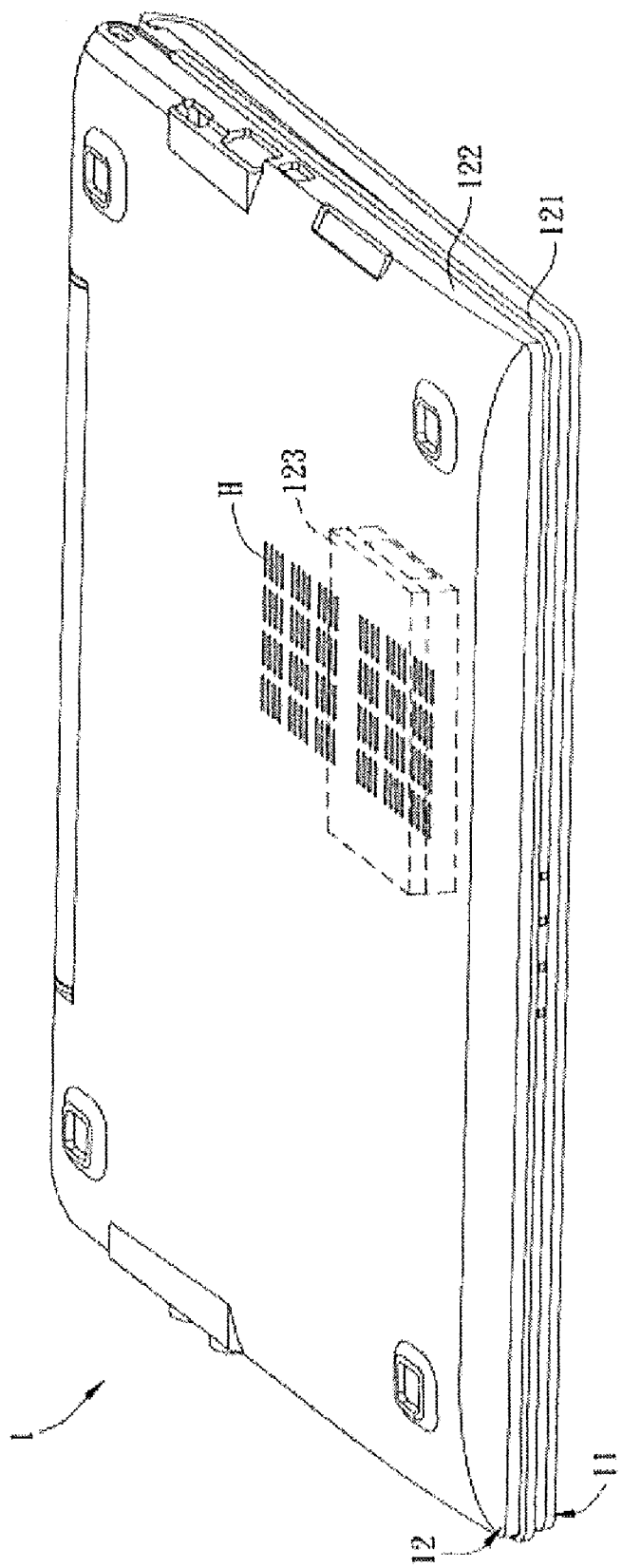
FIG. 1 is a schematic diagram showing a conventional notebook computer.
Figure 2A:
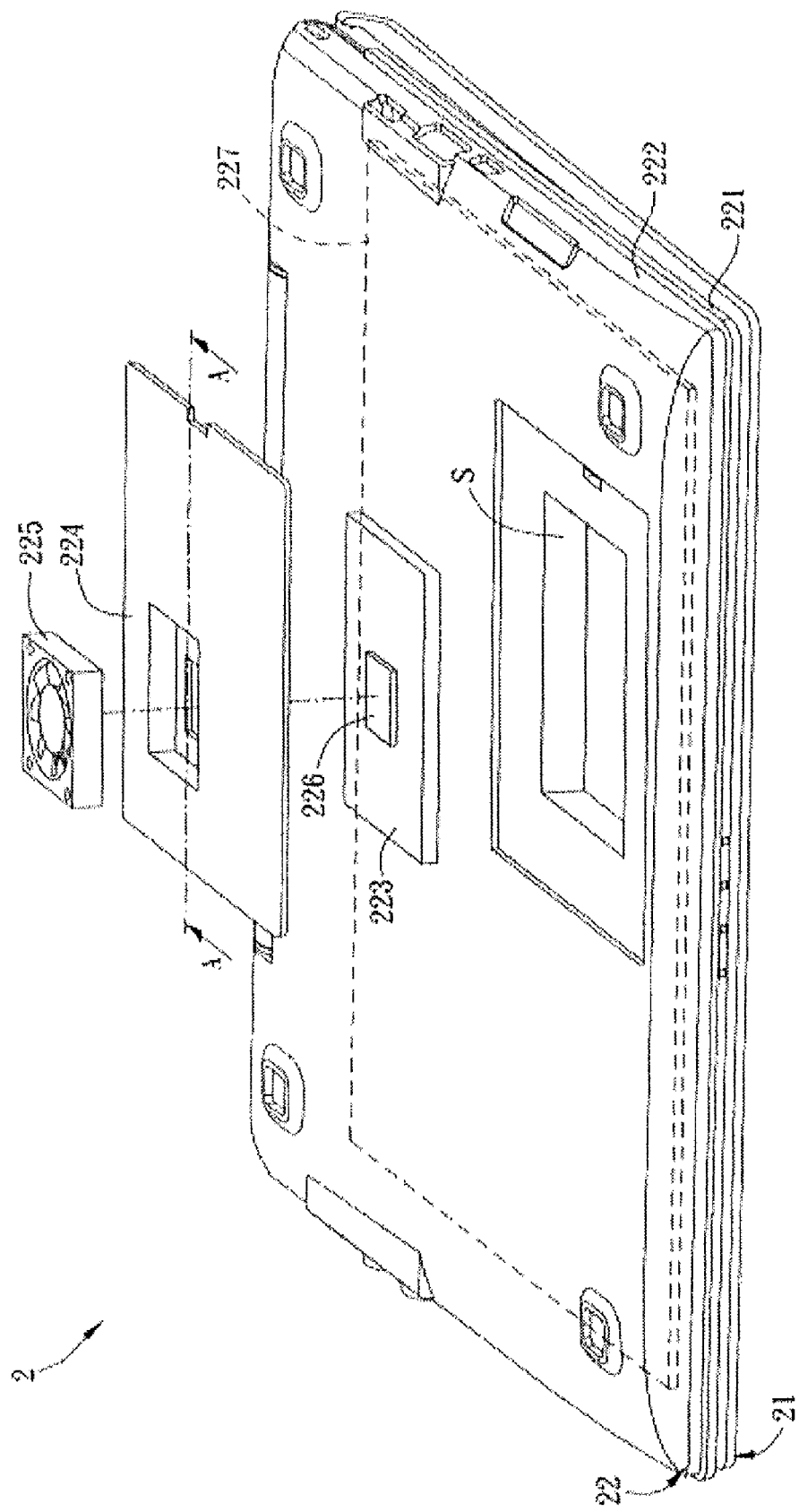
FIG. 2A is a schematic diagram showing an industrial computer according to a first embodiment of the invention.
Figure 2B:
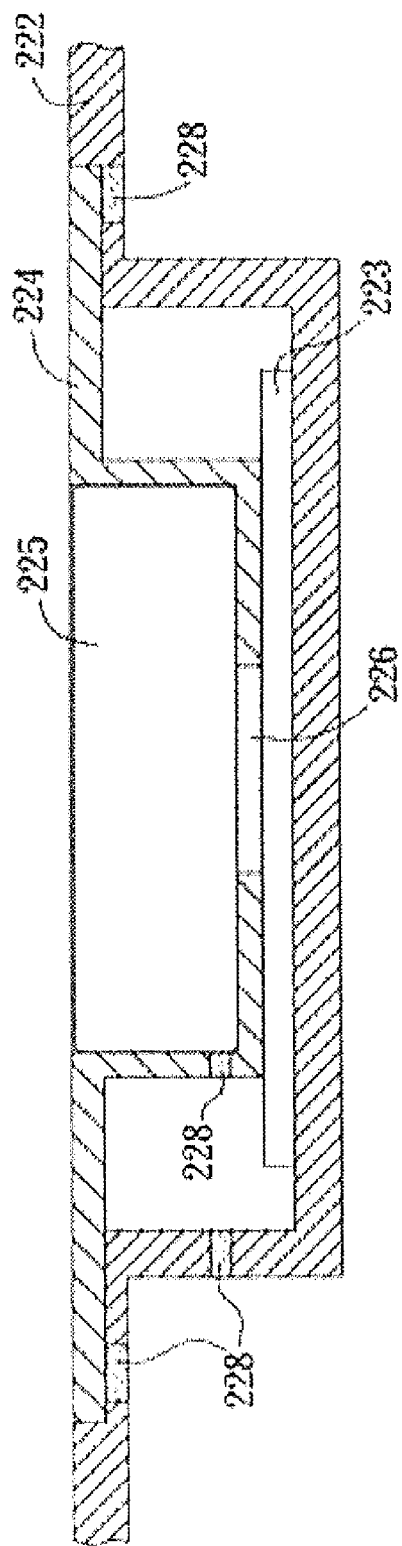
FIG. 2B is a sectional schematic diagram showing the industrial computer along a line A-A in FIG. 2A according to the first embodiment of the invention.

FIG. 2A is a schematic diagram showing an industrial computer 2 according to a first embodiment of the invention. FIG. 2B is a sectional schematic diagram showing the industrial computer 2 along a line A-A in FIG. 2A. In FIG. 2B, only a second casing 222, a storage unit 223, a cover 224, and a heat dissipation unit 225 are shown for clear description.

The industrial computer 2 includes a display portion 21, a main body portion 22, a first casing 221, a second casing 222, a storage unit 223, a cover 224, and a heat dissipation unit 225.

The first casing 221 and the second casing 222 may be made of metal, an alloy, or a high polymer. The second casing 222 and the first casing 221 form a closed casing, and the outside of the second casing 222 has a containing area S.

The storage unit 223 is disposed at the containing area S. The storage unit 223 may be a solid state drive (SSD) or a conventional hard disk drive (HDD).

The cover 224 is removably assembled at the second casing 222 to close the containing area S and contact the storage unit 223. The cover 224 and the second casing 222 may be connected with each other in a fastened mode, a screwed mode, or an embedded mode. In the embodiment, the cover 224 and the second casing 222 are connected with each other in a fastened mode. However, the invention is not limited thereto. The cover 224 may be made of metal, an alloy, or a high polymer.

The alloy may be an alloy of aluminum and magnesium, thereby improving heat conducting efficiency. Therefore, when the storage unit 223 is to be replaced, the cover 224 just needs to be separated from the second casing 222.

The heat dissipation unit 225 is disposed at the cover 224 and corresponds to the storage unit 223. The heat dissipation unit 225 may include a heat sink, a heat dissipation fin, a heat dissipation plate, a heat pipe, or a heat dissipation fan. In the embodiment, the heat dissipation unit 225 includes a heat dissipation fan. However, the invention is not limited thereto.

In addition, in the embodiment, the industrial computer 2 can further include a thermal pad 226 and a main body unit 227.

The thermal pad 226 is connected with the storage unit 223 and the heat dissipation unit 225. A hole may be disposed at the second casing 222 and correspond to the storage unit 223, such that the thermal pad 226 correspond to the hole and be disposed between the storage unit 223 and the heat dissipation unit 225. Therefore, the thermal pad 226 is used to increase the heat conducting efficiency and the heat dissipation efficiency.

The main body unit 227 is disposed in the closed casing formed by the first casing 221 and the second casing 222. The main body unit 227 may include a motherboard, a central processing unit (CPU), a north bridge chip, a south bridge chip, a memory and so on. The components included in the main body unit 227 are not shown in FIG. 2B for clear description. However, in an actual application, the main body unit 227 should include the components.

Therefore, the heat dissipation unit 225 is disposed and correspond to the storage unit 223 to dissipate the heat generated by the storage unit 223 to the heat dissipation fan of the heat dissipation unit 225 by the thermal pad 226. Then, the heat dissipation fan of the heat dissipation unit 225 dissipates the heat outside. Thereby, the heat dissipation of the heat dissipation unit 225 for the storage unit 223 is greatly improved, and a heat dissipation structure such as a heat dissipation hole can be avoided. Thus, the industrial computer 2 in the embodiment of the invention has the waterproof and dustproof effect to satisfy the industrial standard requirements.

The industrial computer 2 in the embodiment further include a plurality of waterproof elements 228 disposed between the second casing 222 and the cover 224 to close the containing area S or disposed between the cover 224 and the heat dissipation unit 225. The waterproof elements 228 may be made of rubber or other high polymer materials. Therefore, by disposing the waterproof elements 228 at the gap between the second casing 222 and the cover 224 or at a through hole for allowing cables electrically connecting the heat dissipation fan of the heat dissipation unit 225 and the main body unit 227 to pass through or the gap between the cover 224 and the heat dissipation unit 225 and so on. The waterproof and dustproof effect of the industrial computer 2 are further improved thus to satisfy the industrial standard requirements of the industrial computer 2.

Figure 3A:
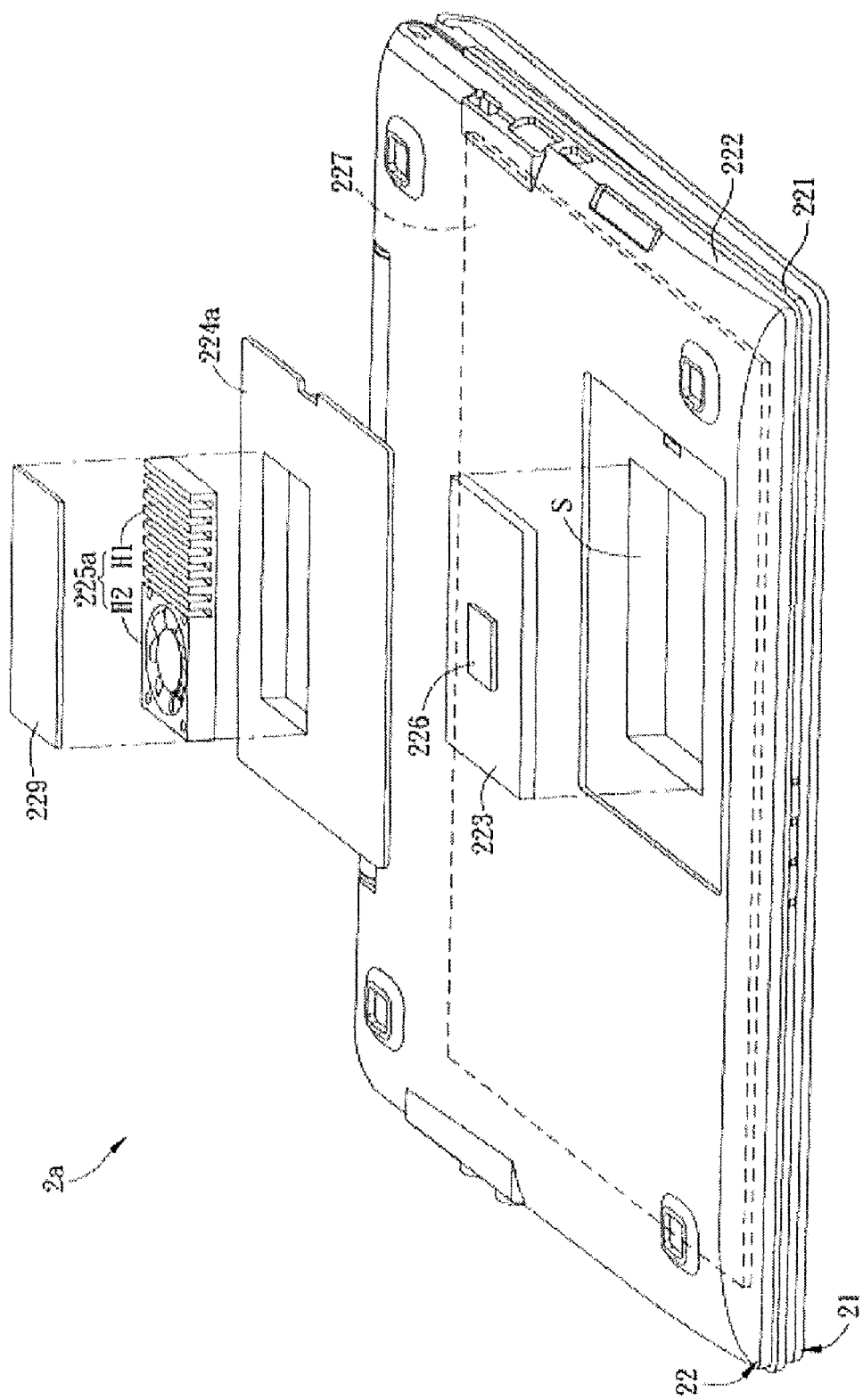
FIG. 3A and FIG. 3B are schematic diagrams showing an industrial computer in different modes according to the first embodiment of the invention.
Figure 3B:
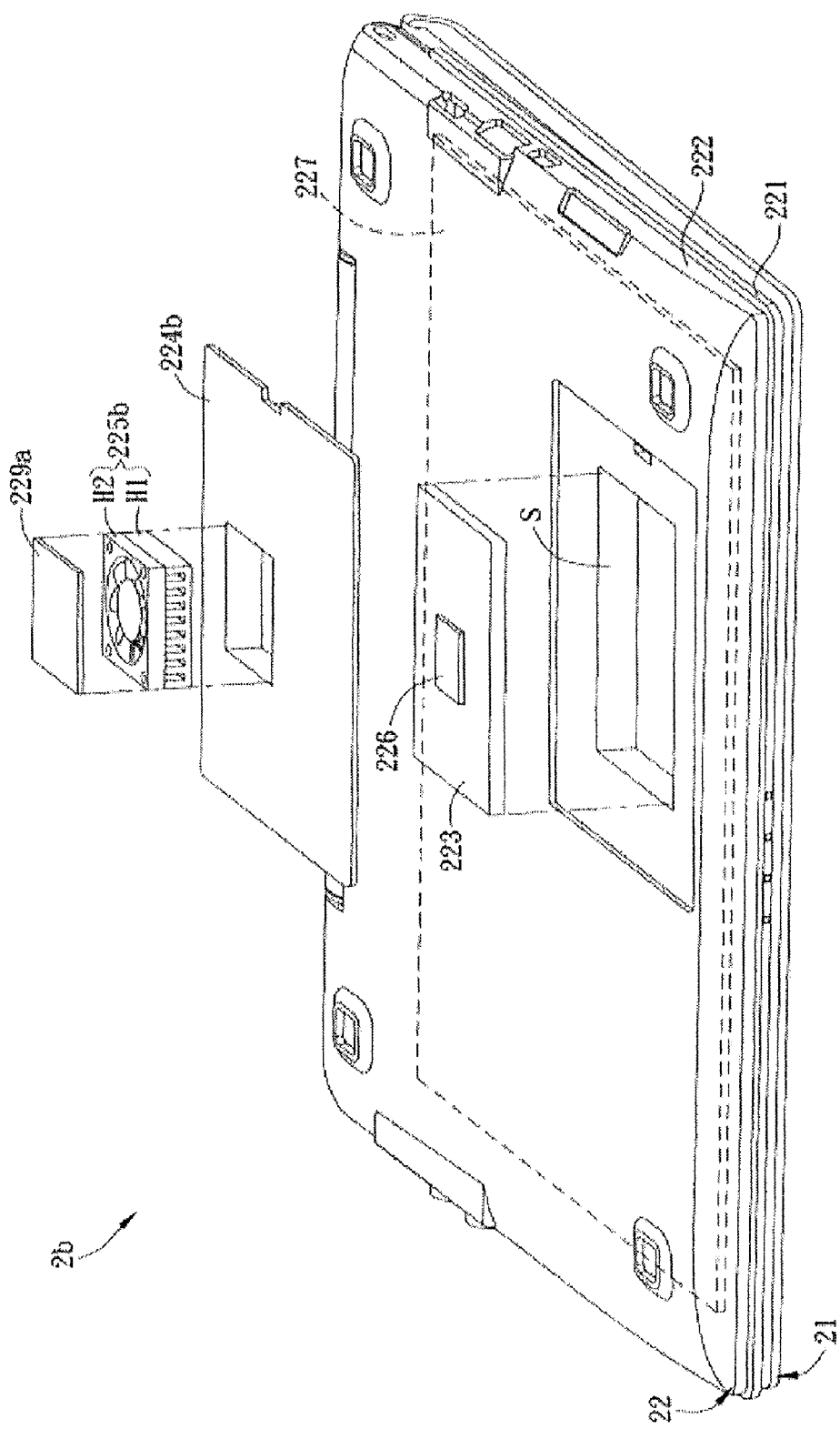

FIG. 3A and FIG. 3B are schematic diagrams showing industrial computers 2a, 2b in different modes according to the first embodiment of the invention. Heat dissipation units 225a, 225b of the industrial computers 2a, 2b may include a first heat dissipation element H1 and a second heat dissipation element H2, respectively, and both the first heat dissipation element H1 and the second heat dissipation element H2 are disposed on the covers 224a, 224b. The first heat dissipation element H1 and the second heat dissipation element H2 may be a heat sink, a heat dissipation fin, a heat dissipation plate, a heat pipe, or a heat dissipation fan, respectively. In the embodiment, the first heat dissipation element H1 and the second heat dissipation element H2 are a heat dissipation fin and a heat dissipation fan, respectively. However, the invention is not limited thereto.

The first heat dissipation element H1 and the second heat dissipation element H2 are disposed on the covers 224a, 224b side by side, as shown in FIG. 3A, or in a stacked mode, as shown in FIG. 3B. Therefore, the heat dissipation of the heat dissipation units 225a, 225b for the storage unit 223 may be improved by the first heat dissipation element H1 and the second heat dissipation element H2.

In addition, the industrial computers 2a, 2b may include appearance elements 229, 229a assembled at the covers 224a, 224b. Therefore, the appearance elements 229, 229a cover the heat dissipation units 225a, 225b to decorate the industrial computers 2a, 2b. Further, the appearance elements 229, 229a may be made of a material with a high thermal conductivity, such as metal or an alloy and so on, such that the heat generated by the storage unit 223 is effectively dissipated outside by heat conduction.

Second Embodiment

Figure 4:
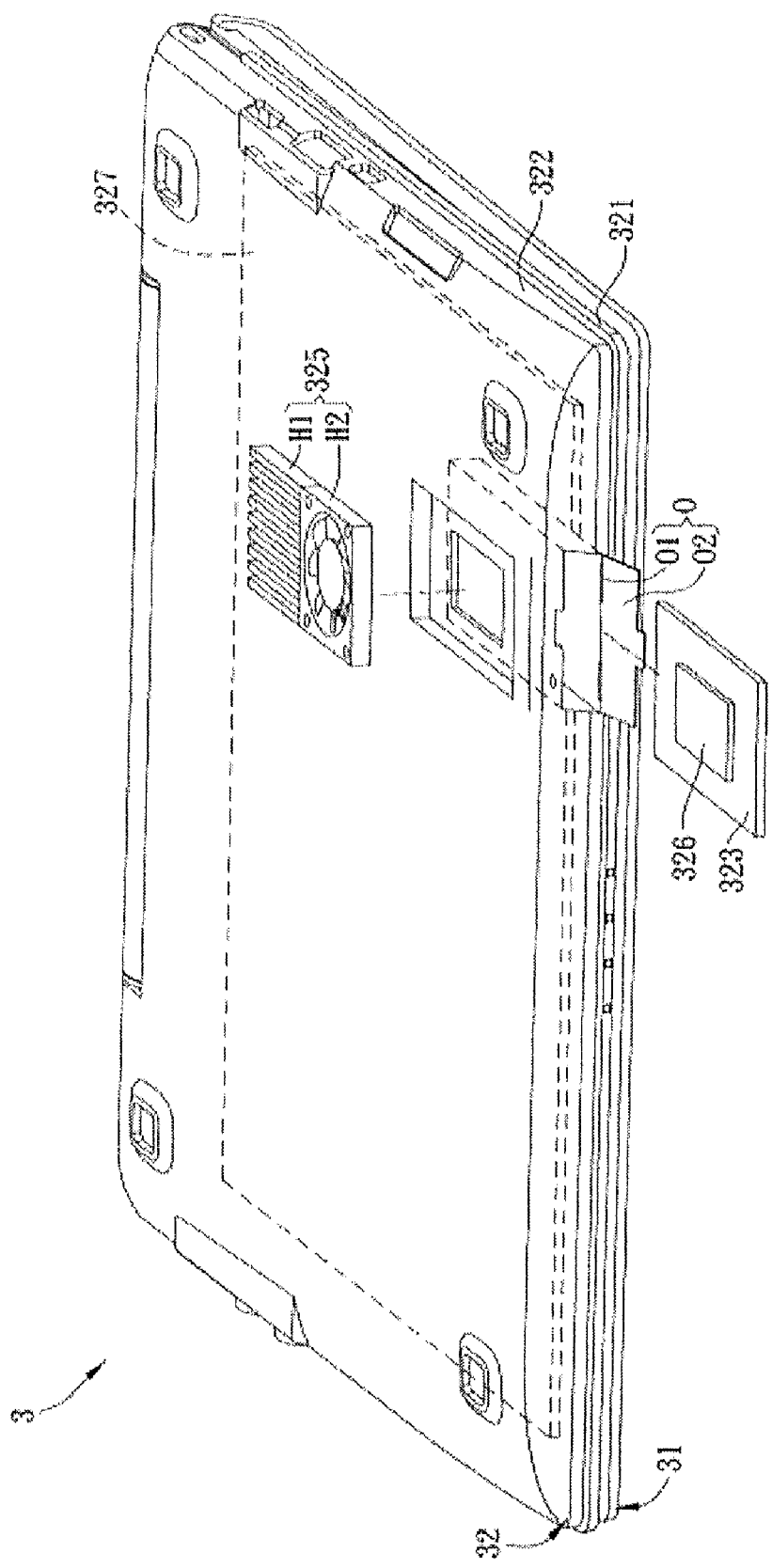
FIG. 4 is a schematic diagram showing an industrial computer according to a second embodiment of the invention.

FIG. 4 is a schematic diagram showing an industrial computer 3 according to a second embodiment of the invention. The industrial computer 3 includes a display portion 31, a main body portion 32, a first casing 321, a second casing 322, a storage unit 323, a cover O, and a heat dissipation unit 325. In addition, in the embodiment, the industrial computer 3 may include a thermal pad 326 and a main body unit 327.

The difference between this embodiment and the first embodiment is that the storage unit 323 of the industrial computer 3 is disposed in a closed casing formed by the first casing 321 and the second casing 322, and an opening of a containing area of the second casing 322 is disposed at a lateral surface of the casing. The cover O is openably assembled at the second casing 322, The cover O may include a cover plate O2 and a hinge structure O1. The cover plate O2 rotates by the hinge structure O1 to cover or expose the containing area. The storage unit 323 is disposed at the containing area and may be taken out for replacement via the opening of the containing area. The structure of the cover O is not limited thereto. For example, the hinge structure of the cover may be disposed at other places, such as a short edge of the opening. Otherwise, the cover may be detachable, and be separated from the second casing to expose the opening of the containing area.

The heat dissipation unit 325 is disposed at the containing area and contacts the storage unit 323. The heat dissipation unit 325 may include a heat sink, a heat dissipation fin, a heat dissipation plate, a heat pipe, or a heat dissipation fan, Otherwise, the heat dissipation unit 325 may also include a first heat dissipation element H1 and a second heat dissipation element H2, and the first heat dissipation element H1 and the second heat dissipation element H2 may also be disposed in the containing area of the second casing 322 side by side or in a stacked mode. In the embodiment, the heat dissipation unit 325 includes a first heat dissipation element H1 and a second heat dissipation element H2. The first heat dissipation element H1 and the second heat dissipation element H2 are a heat dissipation fin and a heat dissipation fan, respectively, and they are disposed in the containing area of the second casing 322 side by side. However, the invention is not limited thereto.

Therefore, the heat dissipation unit 325 is disposed at the other side of the second casing 322 and corresponds to the storage unit 323. The heat generated by the storage unit 323 may be dissipated to the first heat dissipation element H1 and the second heat dissipation element H2 of the heat dissipation unit 325 by the thermal pad 326 and then be dissipated outside by the first heat dissipation element H1 and the second heat dissipation element H2. Thereby, the heat dissipation of the heat dissipation unit 325 for the storage unit 323 is greatly improved, and the heat dissipation structure such as a heat dissipation hole may be avoided. Thus, the industrial computer 3 in the embodiment of the invention has the waterproof and dustproof effect to satisfy the industrial standard requirements.

The industrial computer 3 may include a plurality of waterproof elements and an appearance element. The waterproof elements are disposed at the second casing 322 or between the second casing 322 and the heat dissipation unit 325. By disposing the waterproof elements at the gap or a through hole of the second casing 322 for allowing cables for electrically connecting the heat dissipation fan of the heat dissipation unit 325 and the main body unit 327 to pass through or at the gap between the second casing 322 and the heat dissipation unit 325. The waterproof and the dustproof effect of the industrial computer 3 are greatly improved, such that the industrial computer 3 satisfies the industrial standard requirements. Further, the appearance element is assembled at the second casing 322. The appearance element covers the heat dissipation unit 325 to decorate the industrial computer 3. Further, the appearance element may be made of a material with a high thermal conductivity, such as metal or an alloy and so on, such that the heat generated by the storage unit 323 is effectively dissipated outside by heat conduction.

To sum up, according to the industrial computer in the embodiments of the invention, the heat dissipation unit corresponds to the storage unit, and the heat dissipation unit may include a heat sink, a heat dissipation fin, a heat dissipation plate, a heat pipe, a heat dissipation fan, or a combination thereof. Therefore, the heat dissipation of the storage unit is greatly improved by the heat dissipation element, such as a heat dissipation fin or a heat dissipation fan and so on, and the heat dissipation structure such as a heat dissipation hole can be avoided. Thus, the industrial computer in the embodiments of the invention achieves the waterproof and dustproof effect to satisfy the industrial standard requirements.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An industrial computer comprising:
   a first casing;
   a second casing, the second casing and the first casing forming a closed casing, the outside of the second casing having a containing area;
   a storage unit disposed at the containing area;
   a cover removably assembled at the second casing to cover the containing area and contact the storage unit; and
   a heat dissipation unit disposed at the cover.

2. The industrial computer according to claim 1, wherein the heat dissipation unit comprises a heat sink, a heat dissipation fin, a heat dissipation plate, a heat pipe, or a heat dissipation fan.

3. The industrial computer according to claim 1, wherein the heat dissipation unit comprises a first heat dissipation element and a second heat dissipation element disposed, and both of them are disposed on the cover.

4. The industrial computer according to claim 3, wherein the first heat dissipation element and the second heat dissipation element are disposed on the cover side by side or in a stacked mode.

5. The industrial computer according to claim 3, wherein the first heat dissipation element and the second heat dissipation element comprises a heat sink, a heat dissipation fin, a heat dissipation plate, a heat pipe, or a heat dissipation fan.

6. The industrial computer according to claim 1, further comprising:
   a thermal pad connected with the storage unit and the heat dissipation unit.

7. The industrial computer according to claim 1, further comprising:
   a plurality of waterproof elements disposed between the cover and the heat dissipation unit.

8. The industrial computer according to claim 1, further comprising:
   a plurality of waterproof elements disposed between the second casing and the cover to close the containing area.

9. The industrial computer according to claim 1, further comprising:
   an appearance element assembled at the cover to cover the heat dissipation unit.

10. The industrial computer according to claim 1, further comprising:
    a main body unit disposed in the closed casing and electrically connected with the storage unit.

11. An industrial computer comprising:
    a first casing;
    a second casing, the second casing and the first casing forming a closed casing, the outside of the second casing having a containing area;
    a storage unit disposed at the containing area;
    a cover openably assembly at the second casing to cover or expose the containing area; and
    a heat dissipation unit disposed at the containing area and contacting the storage unit.

12. The industrial computer according to claim 11, wherein the heat dissipation unit comprises a heat sink, a heat dissipation fin, a heat dissipation plate, a heat pipe, or a heat dissipation fan.

13. The industrial computer according to claim 11, wherein the heat dissipation unit comprises a first heat dissipation element and a second heat dissipation element, and both of them are disposed at the containing area.

14. The industrial computer according to claim 13, wherein the first heat dissipation element and the second heat dissipation element are disposed at the containing area side by side or in a stacked mode.

15. The industrial computer according to claim 13, wherein the first heat dissipation element and the second heat dissipation element comprises a heat sink, a heat dissipation fin, a heat dissipation plate, a heat pipe, or a heat dissipation fan.

16. The industrial computer according to claim 11, further comprising:
    a thermal pad connected with the storage unit and the heat dissipation unit.

17. The industrial computer according to claim 11, further comprising:
    a plurality of waterproof elements disposed between the second casing and the heat dissipation unit.

18. The industrial computer according to claim 11, further comprising:
    a plurality of waterproof elements disposed at the second casing.

19. The industrial computer according to claim 11, further comprising:
    an appearance element assembled at the second casing to cover the heat dissipation unit.

20. The industrial computer according to claim 11, further comprising:
    a main body unit disposed in the closed casing and electrically connected with the storage unit.

\* \* \* \* \*